July 12, 1960 G. S. SPENCER 2,944,443
TWO SPEED HUB FOR VELOCIPEDES AND THE LIKE
Filed Oct. 12, 1959 2 Sheets-Sheet 1
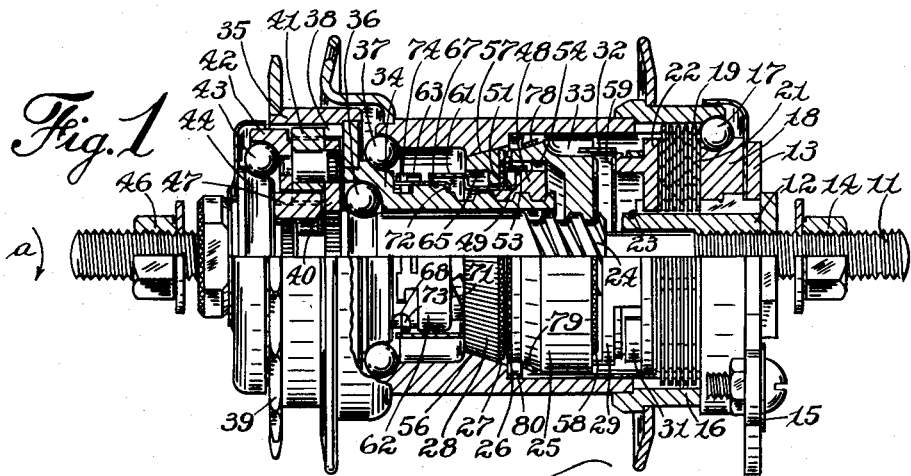
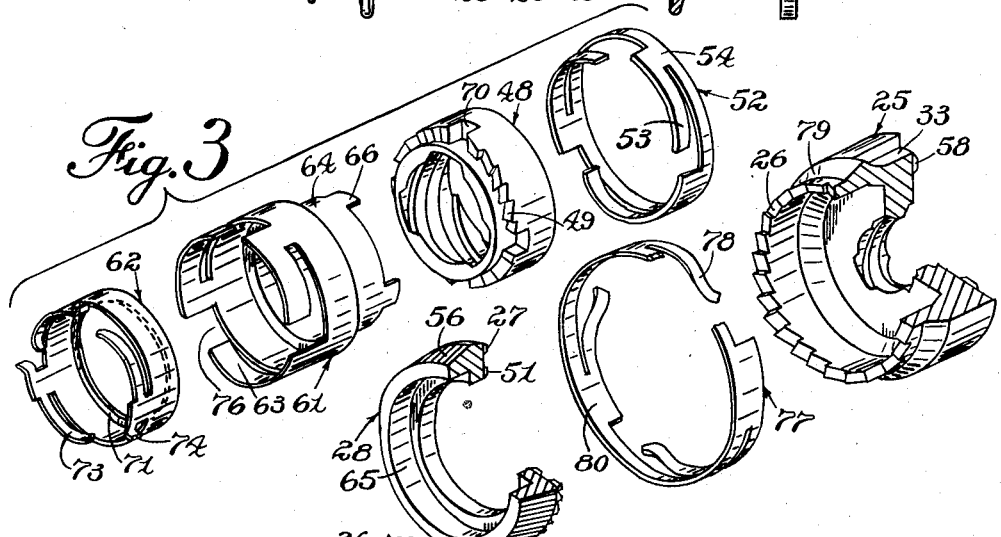
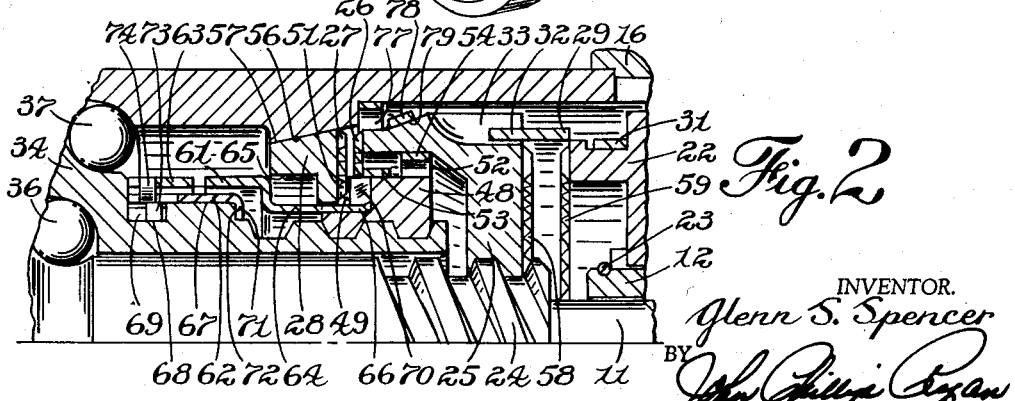
INVENTOR.
Glenn S. Spencer
BY
ATTORNEY July 12, 1960 G. S. SPENCER 2,944,443
TWO SPEED HUB FOR VELOCIPEDES AND THE LIKE
Filed Oct. 12, 1959 2 Sheets-Sheet 2
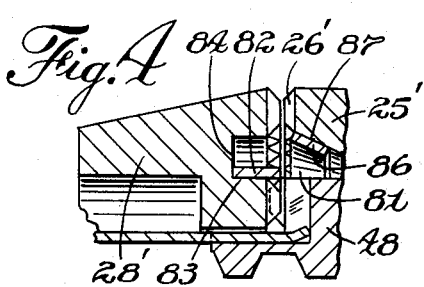
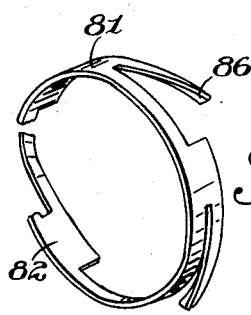
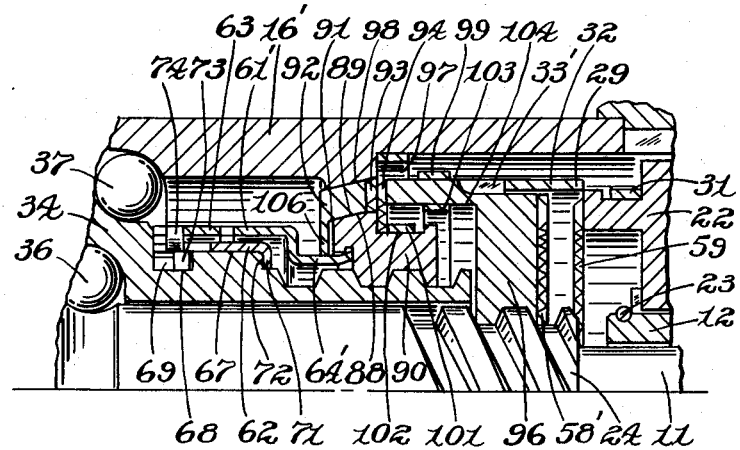
INVENTOR.
Glenn S. Spencer

United States Patent Office 2,944,443
Patented July 12, 1960

2,944,443

TWO SPEED HUB FOR VELOCIPEDES AND THE LIKE

Glenn S. Spencer, Horseheads, N.Y., assignor to Bendix Aviation Corporation, Elmira, N.Y., a corporation of Delaware Filed Oct. 12, 1959, Ser. No. 845,968

14 Claims. (Cl. 74—750)

The present invention relates to a semi-automatic two-speed hub and coaster brake for velocipedes and the like, and more particularly to that type in which the shift from one gear ratio to the other is brought about by a slight backward rotation of the driving member.

The present invention is an improvement of that type of bicycle gearing shown in the U.S. patent to Gleasman, No. 2,882,754, issued April 21, 1959, and the U.S. application of Hood and Gleasman, Serial No. 816,786, filed May 29, 1959, assigned to the assignee of the present application.

In the constructions disclosed in the aforementioned patent and application the hub is provided with two aligned tapered clutch engaging surfaces. For assembly reasons these surfaces are radially offset. The degree or amount of offset is of sufficient magnitude to rule out the use of tubular stock during the manufacturing operations and, consequently, to require the use of more costly and wasteful bar stock. Quite naturally the use of bar stock increases all the associated machining costs since the relationship between the slope dimensions and the driving mechanisms are extremely critical.

An ancillary manufacturing problem is warpage or eccentricities of the hub clutch engaging surfaces introduced or caused during heat treating operations. The reduction of the number of objectionable sources of trouble, i.e. the clutch surfaces, necessarily minimizes the problems inherent in heat treating the hub.

It is the object of the present invention to provide a semi-automatic two-speed hub and coaster brake which is efficient, positive and reliable in operation while being relatively simple in construction.

It is another object to provide a device of this type in which the shift from one ratio to the other is brought about by back pedalling slightly, but does not take place when the operator merely stops pedalling and allows the vehicle to coast forward or even allows the hub to rotate in a backward direction.

More particularly it is an object to provide a hub member having therein a single clutch engaging surface and thereby allowing the utilization during production of more economical raw materials while still retaining separately functioning high and low-speed driver clutch means.

With the enumerated and other objects in view it will be apparent as the description proceeds that this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawing illustrates two examples of the physical embodiment of the invention constructed according to the best mode so far devised for the practical application of the principles thereof, and in which:

Fig. 1 is a longitudinal sectional view, partly broken away, showing a preferred embodiment of the invention and illustrating a direct drive engagement between the hub, the driven clutch member, the high speed driver clutch nut and the driving members;

Fig. 2 is an enlarged sectional detailed view of the embodiment illustrated in Fig. 1, showing the driver clutch nuts, the blocking means which enable the operator to select a desired gear ratio, the driven clutch member and the hub;

Fig. 3 is an exploded detail in perspective of the indexing and abutment member, the selector spring sleeve, the high speed driver clutch nut, the high speed clutch nut retarder, the driven clutch member, the low-speed driver clutch nut-hub retarder and the low-speed driver clutch nut;

Fig. 4 is an enlarged sectional detail showing a modified drag member for preventing the driving engagement of the low-speed driver clutch nut when the high speed driver clutch nut is engaged with the driven clutch member;

Fig. 5 is a detail in perspective, partly broken away, of the drag member utilized in the modification illustrated in Fig. 4; and Fig. 6 is an enlarged sectional detail of a second embodiment of the invention.

Referring now to the accompanying drawings wherein like reference characters have been applied to like parts throughout the several views, in Fig. 1 there is illustrated a stationary axle 11 adapted to be mounted in the rear fork of a bicycle or the like. A brake anchor sleeve 12 is threaded on the axle 11 and held from rotation by an anchor arm 13 non-rotatably mounted thereon retained by a clamp nut 14 and prevented from rotation by a clip 15 adapted to be attached to a frame member of the vehicle in a conventional manner.

A hub 16 is rotatably mounted on the anchor sleeve 12 by means of bearings 17, seated on a bearing cone 18 fixedly mounted on the anchor sleeve 12. Brake discs 19 and 21 are intercalated and splined to the hub 16 and the anchor sleeve 12, respectively, and are arranged to be pressed against the bearing cone 18 by means of a brake actuating member 22 splined on the anchor sleeve 12 and loosely retained thereon by a lock ring 23.

A low-speed screw shaft 24 is rotatably mounted on the axle 11 and has a low-speed driver clutch nut 25 threaded thereon, said nut having a dentil clutch surface 26 adapted to engage a dentil surface 27 formed on a driven clutch member 28. A retarder sleeve 29 having arms 31 bearing frictionally in a peripherial groove of the brake actuating member 22, has a plurality of axially extending fingers 32 slidably engaging in axially extending slots 33 formed in the periphery of the low-speed driver clutch nut 25 to form a splined connection therewith.

A high speed screw shaft 34 is rotatably mounted on the low-speed screw shaft 24 by means of bearings 36 and rotatably supports the hub 16 by means of bearing 37. A driving member 35 for rotating the high speed shaft 34 is provided having a driving sprocket 39 rigid therewith and having an orbit gear member 38 fixedly mounted thereon, the driving member being rotatable by the operator of the vehicle in the usual manner.

Reduction gearing for rotating the low-speed screw shaft from the orbit gear 38 is provided comprising a plurality of planet pinions 41 mounted at one end in a planet carrier 40 forming part of the low-speed screw shaft 24 and supported at their other end in a ring support 42 rotatably mounted on the axle 11 by means of bearings 43 cooperating with a cone member 44 which is clamped to the frame of the vehicle by means of the clamp nut 46. The planet pinions 41 mesh with a sun gear 47 which is rigidly mounted on the cone member 44 whereby rotation of the orbit gear 38 is transmitted to the low-speed shaft member at a reduced speed.

A high speed driver clutch nut 48 is threaded on the high speed screw shaft 34 and said nut has dentil clutch surfaces 49 adapted to engage dentil surfaces 51 formed on the driven clutch member 28. To insure axial traversal of the high speed driver clutch nut 48 on its screw shaft there is provided retarder sleeve 52 having arms 53 bearing frictionally on a peripheral portion of the high speed clutch nut 48 and fixedly secured to the low-speed driver clutch nut by the annulus 54.

Rotation of the low-speed screw shaft 24 in a forward direction as indicated by the arrow (a) in Fig. 1, causes the low-speed driver clutch nut 25 to engage and drive the driven clutch member 28 through the cooperating dentils 26 and 27. The driven clutch member 28 is urged axially to the left in Fig. 1 causing its substantially frusto-conical clutching surface 56 to engage with a conforming tapered surface 57 formed on the interior wall of the hub 16 thereby rotating the hub member at a reduced speed. Backward rotation of the low-speed screw shaft 24 causes the driver clutch nut 25 to traverse on the screw shaft 24 to the right and to engage and operate the brake actuating member 22 which in turn compresses the brake discs 19 and 21. The engaging faces of the low-speed drive clutch nut 25 and the brake actuating member 22 are provided with dentils 58 and 59, respectively, in order to prevent relative rotation during braking engagement.

A selector spring sleeve 61 is rigidly mounted in the high speed drive clutch nut 48 by having its extremity 66 secured, by swaging or any other method, to the base of the notch 70, and an indexing and abutment ring 62 is swiveled on the high speed screw shaft 34 within an encompassing portion of said selector spring sleeve. Spring arms 63 on the selector spring sleeve 61 bear on the periphery of the indexing and abutment ring 62 to form a frictional rotary connection therebetween. The selector spring is provided with a hub portion 64 intermediate the spring arms 63 and its fixed extremity 66. The sleeve hub portion 64 rotatably and slidably journals the driven clutch member 28 and during periods of its travels may carry the driven clutch member axially causing the clutch member to become disengaged from the hub. Axial travel of the sleeve 61 is brought about because of its securement to the high speed clutch nut 48. The driven clutch member 28 is, however, provided with a counterbore 65 which allows for relative axial movement of the sleeve 61 and the clutch member 28 during those periods hereinafter described when the high speed driver clutch nut 48 is indexed so as to prevent its driver engaging the clutch member 28.

The high speed screw shaft 34 has a smooth portion 67 (Fig. 2) on which the indexing and abutment ring 62 rotates freely, and a circumferential channel 68 formed therein adjacent to the smooth portion. A plurality of ratchet teeth 69 are formed in the bottom of said channel. The indexing and abutment ring 62 is provided at one end with an inwardly bent flange 71 which bears against a shoulder 72 on the high speed screw shaft, and adjacent its other end said ring has a plurality of elastic pawls 73 (Fig. 3) extending into the channel 68 to thereby prevent axial movement of the ring. The ends of the pawls 73 engage the ratchet teeth 69 to form an overrunning coupling from the high speed screw shaft 34 to the indexing and abutment ring 62. Said ratchet teeth are preferably undercut slightly in order to prevent disengagement of the pawls under load.

The abutment ring 62 is also provided with outwardly directed tongues or lugs 74 which extend into the path of axial movement of the arms 63 of the selector spring sleeve 61. As best seen in Fig. 1, when these abutment lugs 74 are in registry with said arms 63 they arrest the axial movement of the high speed driver clutch nut 48 and prevent said clutch nut from engaging the driven clutch member 28 and hence prevent its driving the hub 16. When the abutment lugs 74 register with the spaces 76 between the arms 63 of the selector spring sleeve, the high speed clutch nut 48 is permitted to engage and drive the driven clutch member 28 and to urge it axially forcing its clutch surface 56 into engagement with the hub tapered clutch surfaces 57 to drive the hub.

There are twice as many ratchet teeth 69 as there are abutment lugs 74 on the ring 62 and arms 63 on the sleeve 61. As herein illustrated, there are three abutment lugs 74, three arms 63 and six ratchet teeth 69. The relationship of the ratchet teeth 69 with the threads of the high speed screw shaft 34 and the orientation of the selector spring sleeve 61 in the high speed drive clutch nut 48 is such that when the abutment ring 62 is indexed step by step with respect to the ratchet teeth 69, the abutment lugs 74 are brought into registry alternately with the arms 63 and with the spaces 76 between said arms.

When the high speed driver clutch nut 48 is permitted to engage the driven clutch member 28, it is desirable to provide a drag member 77 (Figs. 2 and 3) to prevent the traversal of the low-speed driver clutch nut 25 into concomitant engagement with the driven clutch member 28. The drag member is formed with a plurality of fingers 78 which bear frictionally on an exterior tapered surface 79 of the low-speed driver clutch nut and said member preferably has its annular body portion 80 affixed in any suitable manner to the interior surface of the hub 16 adjacent the outer most portion of the tapered clutch surface 57.

In operation, starting with the parts in the positions illustrated in Fig. 1 forward rotation of the driving member 35 by the sprocket 39 is transmitted to the high speed shaft 34, but since the abutment lugs 74 are in abutting relation with the arms 63 of the selector sleeve 61, the high speed driver clutch nut 48 is prevented from rotating the hub 16 through the medium of the driven clutch member 28. The low speed screw shaft 24 is also concomitantly rotated by means of the planetary gearing 38, 41, 47 whereby the low-speed driver clutch nut 25 is traversed into driving relation with the hub 16 through the medium of the driven clutch member 28, and rotates the hub at low gear speed.

When it is desirable to operate at a high gear speed the operator back pedals slightly, thus rotating the screw shafts 24 and 34 backwardly. The high speed drive clutch nut 48 is prevented from backward rotation by its frictional connection through the retarders 52 and 29 to the axle 11 whereby the selector spring sleeve 61 is also prevented from rotation. The indexing and abutment ring 62 is held from rotation by its frictional connection 63 with the selector sleeve 61. The abutment ring 62 is thus indexed one tooth forwardly on the high speed screw shaft. Upon subsequent forward rotation of the driving member 35 and since the abutments 74 on the abutment ring 62 now register with the spaces 76 between the arms 63 of the selector spring sleeve 61, the high speed drive clutch nut 48 is now permitted to engage the driven clutch member 28 urging its clutching surface 56 into driving relation with the hub tapered surface 57 and to thereby drive the hub 16 at the same speed as the driving member. Since the low-speed screw shaft 24 is also being rotated by the driving member 35 the low-speed drive clutch nut will be caused to traverse its respective shaft towards engagement with the driven clutch member 28. The spring like finger 78 of the drag member 77 will be caused to frictionally bear on the surface 79 of the low-speed driver clutch nut 25 and since the hub is rotating at a faster rate than the driver clutch nut, said nut will be prevented from further axially traversing the screw shaft and will be held out of engagement with the driven clutch member 28.

In Figs. 4 and 5 of the drawing, there is illustrated a modified drag member 81 in the form having an annular body 82 fixedly secured to the interior side wall 83 of a counterbore 84 formed in a driven clutch member 28' and having a plurality of axially and radially extending fingers 86 slidably engageable with a tapered surface 87 provided radially inwardly adjacent to the low-speed driver clutch nut 25' dentil surface 26'. The remaining parts are the same as in the embodiment first described and are similarly numbered. The operation of this embodiment is the same as above described.

In Fig. 6 of the drawing, there is illustrated a second embodiment of the invention illustrating a high speed driver clutch nut 90 utilizing a substantially conical clutch surface 88 engaging a conforming surface 89 formed in one side wall of the counterbore 91 of the driven clutch member 92. The driven clutch member 92 is provided with a dentil surface 93 cooperating with a dentil surface 94 formed on the low-speed driver clutch nut 96. A drag member 97 is secured to the inner surface of the hub 16' axially adjacent to the tapered clutch surface 98 and has spring fingers 99 frictionally bearing on the peripheral surface of the low-speed driver clutch member 96 to prevent the undesirable engagement of said clutch nut while the high speed driver clutch member 90 is in driving engagement with the driven clutch member 92. Retarder means 101 is secured in any suitable manner in a peripheral recess 102 in the driving clutch nut 90 and has spring fingers 103 frictionally bearing on the counterbored surface 104 of the low-speed driver clutch nut 96 to ensure the traversal of the high speed clutch nut 90 in either direction by appropriate rotation of its screw shaft. The driven clutch member 92 is slidably and rotatably journalled on the portion 64' of the selector spring sleeve 61' by means of an integral flange member 106. It will be noted, however, that the flange 106 occupies only a small portion of the axial width of the hub 64' so as to allow relative axial movement between the driven clutch member 92 and the sleeve 61' thereby allowing the driven clutch member 92 to function when the high speed driver clutch nut 90 is indexed so as to prevent its engagement with the driven clutch member 92. The remaining parts of the embodiment disclosed in Fig. 6 are the same as the embodiment first described and are similarly numbered. The operation of this embodiment is the same as above described.

It will be appreciated that there is here illustrated and described an under-drive or hill climing gearing arrangement but by appropriate changes being made in the driving member and the gear mechanisms incorporating the orbit, sun and pinion gears, this invention could be made equally applicable to an over-drive or high speed gearing arrangement instead.

I claim:

1. In a two-speed hub for velocipedes and the like a fixed axle, a first screw shaft member rotatably mounted on the axle, a first driver clutch nut threaded on said first screw shaft and having a clutch engaging surface, a second screw shaft member rotatably mounted on said first screw shaft, a second driver clutch nut threaded on said second screw shaft and having a clutch engaging surface, a driver member, means for rotating said screw shafts from said driver member at different gear ratios, a hub rotatably mounted relative to said axle and having a clutch surface, a driven clutch member rotatably mounted relative to said axle having a clutch surface engageable with said hub clutch surface and having other clutch surfaces selectively engageable with said driver clutch nut surfaces, retarder means for frictionally resisting rotation of said driver clutch nuts whereby said driver clutch nuts are caused to traverse their respective screw shafts, means under the control of the operator for blocking the engaging movement of the of one of said driver clutch nuts including a selector sleeve, an indexing and abutment ring swivelled on one of said shafts in the path of said sleeve, said sleeve having an arm bearing frictionally on said ring and having a complementing arcuate slot provided therein, said ring having a radial lug movable into and out of the path of said arm, said ring also having a spring pawl bearing on the periphery of said one shaft, said one shaft having ratchet teeth formed therein for cooperating with said pawl to index the ring on said one screw shaft responsive to backward and forward rotation.

2. The two-speed hub as set forth in claim 1 characterized by the fact that said selector sleeve is fixedly secured at one end to said one driver clutch nut and having a tubular portion intermediate said one driver clutch nut and said arm, and further characterized by the fact that the driven clutch member is slidably and rotatably journalled on said tubular portion.

3. A two-speed hub as set forth in claim 2 including drag means frictionally opposing engaging movement of said first driver clutch nut during the driving engagement of said second driver clutch nut with the driven clutch member.

4. The two-speed hub as set forth in claim 2 in which said driver clutch nut clutch engaging surfaces comprise dentil means and said other surfaces of the driven clutch member comprises dentil means cooperating with said driver clutch nut dentil means.

5. A two-speed hub as set forth in claim 2 in which the driven clutch member is formed with a counterbore having an axially tapered side wall providing one of said other clutch surfaces, and said one driver clutch nut has a conical clutch engaging surface engageable with the driven clutch tapered side wall.

6. A two-speed hub as set forth in claim 3 in which the drag member comprises an annular ring portion fixedly secured on the hub and having circumferentially spaced arms biased radially inwardly and frictionally bearing on said first driver clutch nut.

7. A two-speed hub as set forth in claim 3 in which the drag member comprises an annular ring portion fixedly secured on said driven clutch member and having circumferentially spaced arms radially and axially biased into frictional engagement with said first driver clutch nut.

8. In a two-speed hub and coaster brake for velocipedes and the like a fixed axle, a low-speed screw shaft member rotatably mounted on the axle, a low-speed driver clutch nut threaded on the low-speed screw shaft, a high speed screw shaft member rotatably mounted on the low-speed screw shaft, a high speed driver clutch nut threaded on the high speed screw shaft, means for rotating the high speed screw shaft member, reduction gearing connecting the high speed shaft member to the low-speed shaft member, a hub rotatably mounted relative to the axle and having a tapered clutch surface, a driven clutch member rotatably mounted relative to the axle having conical clutch surface engageable with the hub tapered clutch surface and having other clutch surfaces selectively engageable with said driver clutch nuts upon forward rotation of their respective screw shaft members, retarder means for frictionally resisting rotation of said driver clutch nuts, whereby said driver clutch nuts are caused to traverse their respective rotating screw shaft members, means under the control of the operator for blocking the engaging movement of the high speed driver clutch nut including a selector sleeve fixedly mounted on the high speed driver clutch nut, an indexing and abutment ring swivelled on the high speed screw shaft member in the path of travel of the selector sleeve, said selector sleeve having a plurality of equally spaced, circumferentially arranged arms bearing frictionally on the abutment ring, said abutment ring having a plurality similarly spaced radial lugs movable into and out of the path of said arms, said abutment ring also having a spring pawl bearing on the periphery of the high speed screw shaft member, said high speed screw shaft having ratchet teeth formed thereon for cooperating with said pawl to index the abutment ring on the high speed shaft member responsive to backward and forward rotation of the high speed screw shaft.

9. A two-speed hub and coaster brake as set forth in claim 8 including drag means frictionally opposing engaging movement of the low-speed driver clutch nut during driving engagement of the high speed driver clutch nut and driver clutch member whereby undesirable dual driver clutch nut engagement is prevented.

10. A two-speed hub and coaster brake as set forth in claim 8 in which the selector sleeve has a hub portion intermediate said high speed clutch nut and said arms, and further having said driven clutch rotatably and slidably journalled on said hub portion.

11. A two-speed hub and coaster brake as set forth in claim 8 in which said driver clutch nuts have dentil clutch engaging surfaces provided thereon, and said other surfaces of the driven clutch member comprise dentil means cooperating with said driver clutch nut dentil means.

12. A two-speed hub and coaster brake as set forth in claim 8 in which the driven clutch member is formed with a counterbore having an axially tapered side wall providing one of said other clutch surfaces, and said high speed driver clutch nut has a conical clutch engaging surface engageable with the driven clutch tapered side wall.

13. A two-speed hub and coaster brake as set forth in claim 9 in which the drag member comprises an annular ring portion fixedly secured on the hub and having circumferentially spaced arms biased radially inwardly and frictionally bearing on said low-speed driver clutch nut.

14. A two-speed hub and coaster brake set forth in claim 9 in which the drag member comprises an annular ring portion fixedly secured on said driven clutch member and having circumferentially spaced arms radially and axially biased into frictional engagement with said low-speed driver clutch nut.

No references cited.